United States Patent [19]

Jansen et al.

[11] 4,314,668

[45] Feb. 9, 1982

[54] METHOD OF HEATING WITH AN ABSORPTION HEAT PUMP

[75] Inventors: Harald Jansen, Kelkheim; Gerhard Oelert, Bad Homburg; Hans-Jurgen Kohnke, Holzminden, all of Fed. Rep. of Germany

[73] Assignee: Stiebel Eltron GmbH & Co., KG, Holzmindenl, Fed. Rep. of Germany

[21] Appl. No.: 5,897

[22] Filed: Jan. 23, 1979

[30] Foreign Application Priority Data

Jan. 25, 1978 [DE] Fed. Rep. of Germany ....... 2803118

[51] Int. Cl.³ ............................................. G05D 23/00
[52] U.S. Cl. ..................................... 237/2 B; 62/483; 62/489; 62/238.3; 62/324.2; 165/62
[58] Field of Search .................... 237/2 B; 165/62, 64; 62/483, 489, 238.3, 324.1, 324.2

[56] References Cited

U.S. PATENT DOCUMENTS

| | | | |
|---|---|---|---|
| 2,272,871 | 2/1942 | McGrath | 62/238 B |
| 3,041,853 | 7/1962 | Harwich | 62/489 |
| 3,717,007 | 2/1973 | Kuhlenschmidt | 62/483 |
| 3,742,728 | 7/1973 | Mamiya | 62/483 |
| 3,817,046 | 6/1974 | Adki et al. | 62/238 B |
| 4,037,649 | 7/1977 | Haltkin | 165/62 |
| 4,171,619 | 10/1979 | Clark | 62/483 |

FOREIGN PATENT DOCUMENTS

| | | | |
|---|---|---|---|
| 969268 | 5/1958 | Fed. Rep. of Germany | 62/483 |
| 2528736 | 1/1977 | Fed. Rep. of Germany | 62/489 |
| 2727990 | 1/1978 | Fed. Rep. of Germany | 62/489 |
| 2659641 | 7/1978 | Fed. Rep. of Germany | 62/489 |
| 415703 | 1/1967 | Switzerland | 62/489 |

*Primary Examiner*—Albert J. Makay
*Assistant Examiner*—Henry Bennett
*Attorney, Agent, or Firm*—Abelman, Frayne & Rezac

[57] ABSTRACT

A method of heating with an absorption heat pump in which absorber pressure is produced independently of evaporation pressure by a compressor, and/or the lean mixture returning to the absorber is cooled in a main heat exchanger to temperatures lower than is possible in the heat exchanger located between the absorber and the desorber, and the desorber is operated adiabatically. A jet apparatus may be used as a compressor unit. The cooling agent cycle may be shut off in case of inadequate evaporator pressure dependent on the outside temperature, and the mixture cycle may be used as a heat carrier. The heat exchanger may be bypassed during heat carrier operation and the heat may be delivered exclusively via the main heat exchanger. If the desorber operates on oil, gas or solid fuel, fuel gases may be cooled in a unit behind the desorber by a medium to be heated. The flue gas is used for evaporating liquid cooling agent and the vaporous cooling agent is used for driving the compressor. A gear pump may be used as mixture pump. A pipe with cooling agent injection and/or static mixers may be used as adiabatic absorber.

4 Claims, 3 Drawing Figures

ξ/h DIAGRAM FOR DIFLUOR MONOCHLOROMETHANE
TETRAETHYLENE GLYCOL MONOMETHYL ETHER
(ACCORDING TO W.P. LATESCHEW, WNICHI N. 3243, MOSCOW 1968)

METHOD OF HEATING WITH AN ABSORPTION HEAT PUMP

BACKGROUND OF INVENTION

The present invention relates to a method for heating by means of an absorption heat pump arrangement. It is particularly well suited for heating buildings.

The thermodynamic fundamentals of absorption arrangements to be used as cooling or heating installations have been known for about 70 years. However, in comparison with the widely used compression arrangements, the absorption heat arrangements have been in use only to a modest degree, because under cost analysis they are inferior to compression arrangements; also they are less advantageous regarding their dimensions and applications. Furthermore, the absorption heat pumps used as power equipment employ the material combinations ammonia/water and water/lithium bromide extensively. The use of ammonia in dwellings is restricted because of safety risks. The highest expulsion temperature for the pair of materials ammonia/water is at 160° to 180° C. Beyond this temperature, excessive corrosion and decomposition occur. The pair of materials water/lithium bromide has the disadvantage that the desoprtion temperature may not exceed 150° C. in view of decomposition, salt elimination and corrosion. Furthermore, when using water as "cooling agent", the evaporation temperature may not be less than 0° C.

The limited applications of the absorption heat pumps used until now, a long time ago led to their combination with other heat engineering systems (W. Niebergall, Absorptionsheizanlagen=absorption heat devices, Kaltetechnik 9 (1957), No. 9, p.238-243). Because of the installation and operating cost increase for smaller building units and because of the larger space requirement, in comparison with competitive heat systems, absorption heat pumps so far have not been developed for the heating of single-family houses (R. Plank, Handbuch der Kaltetechnik, Vol. VI/A, Springer-Verlag, Berlin 1969).

The object of the present invention is the creation of a method for heating buildings competitive with conventional heating plants and compression heat pumps. Implementation of this method should make possible a saving of primary energy over conventional heating practices.

SUMMARY OF INVENTION

It has been found that this object can be attained in a technically progressive manner if in the method for heating buildings with an absorption heat pump the absorber pressure is made independent of the evaporator pressure by means of a compressor and/or the lean mixture returning to the absorber is cooled in a main heat exchanger to lower temperatures than is possible in the secondary heat exchanger located between absorber and desorber and the absorber is operated adiabatically. Preferably, a jet apparatus is used as a compressor and, with an insufficient evaporator pressure, dependent on the outside temperature, the cooling agent cycle is shut off and the mixing cycle is used as a heat carrier. During heat carrier operation, the secondary heat exchanger may be by-passed and the heat may be given off exclusively via the main heat exchanger.

When heating the desorber with oil, gas or solid fuel, the flue gases may be cooled in a unit placed after the desorber with a medium to be heated. The flue gas can be used, for example, for evaporating a flow of liquid cooling agent and the vaporous cooling agent may be used as driving vapor flow in the compressor unit.

However, the flue gases may also be cooled directly on heating system water or tap water. In that case, heat-reduced cooling agent vapor is taken from the condenser as driving steam for the jet apparatus.

Preferably, a gear pump is used as mixture pump and a pipe with static mixers is used as adiabatic absorber.

A suitable working medium for the method in accordance with the present invention is, for example, the pair of materials difluoromonochloroemethane/tetraethyleneglycoldimethyl ether for safe operation in residential buildings. The thermal stability, low corrosiveness and toxicity of this pair of materials ensure a long-lasting and safe usage. In addition, there is a large difference in boiling point between difluoromonochloromethane and tetraethyleneglycoldimethyl ether whereby the boiler or the desorber construction may be simplified because no rectification is required.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
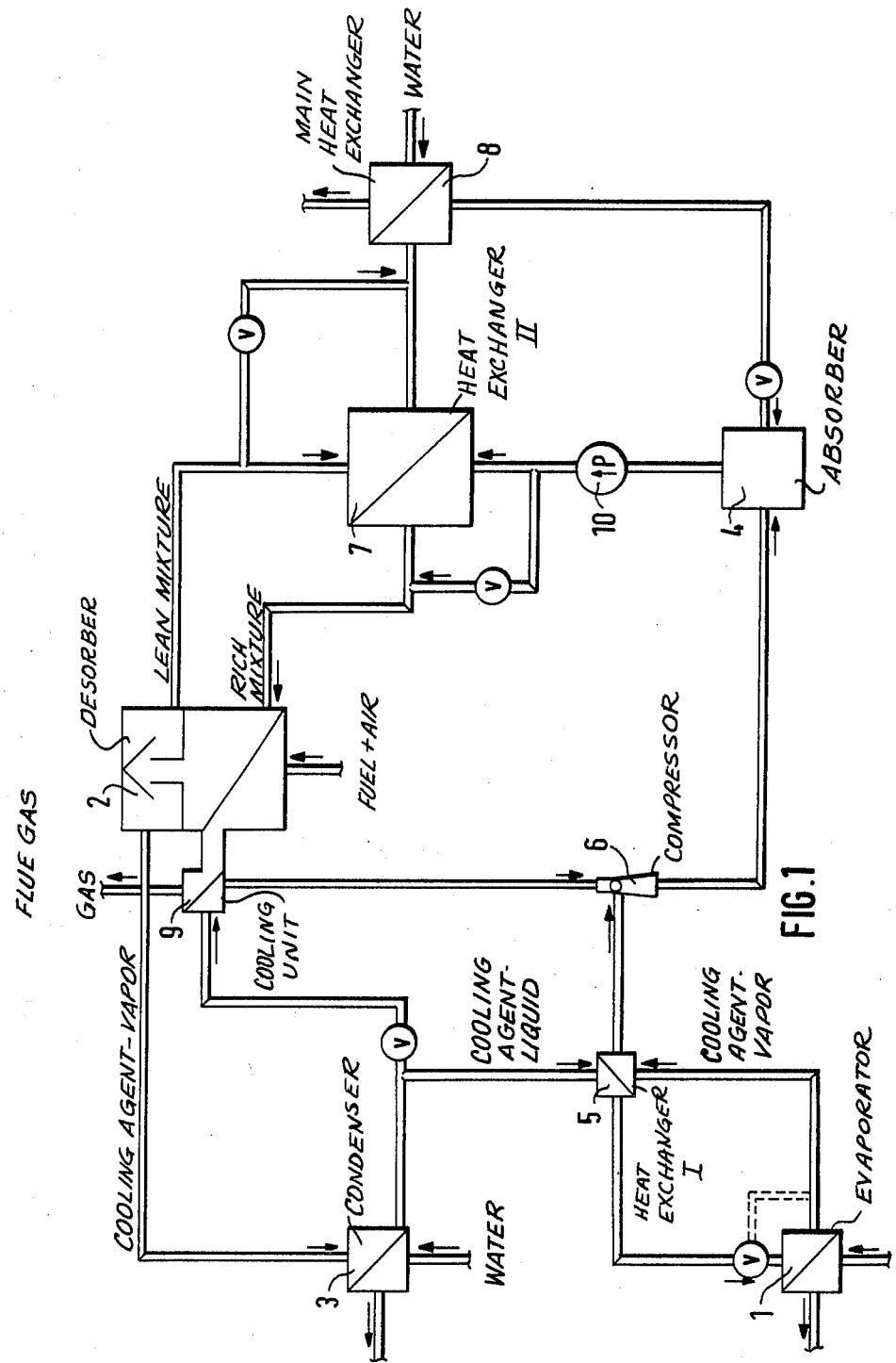
FIG. 1 shows a block diagram of one embodiment of the present invention.
Figure 2:
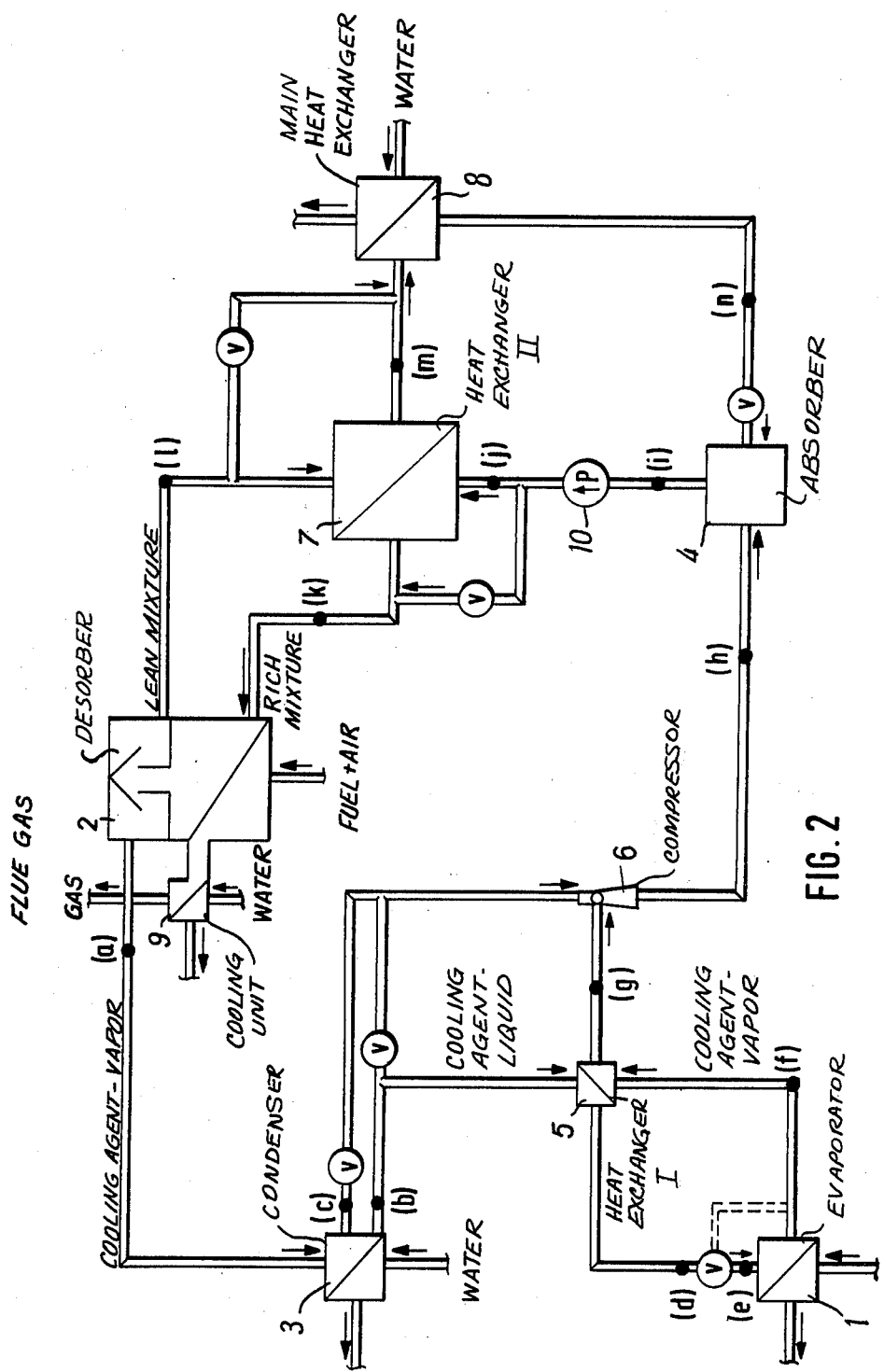
FIG. 2 shows a block diagram of another embodiment.

The schematics of FIGS. 1 and 2 are based on the consideration that the installation completely ensures heating the building even at very low outside temperatures, though for thermodynamic reasons no more heat can be pumped and the installation functions as a mere boiler heating system. With rising outside temperature, the pumped heat flow, introduced by the evaporator 1, rises continuously and should, on the average, be up to 30% of the heat flow which is delivered to the desorber or boiler 2. Also, the installation layout should be as simple as possible. The expeller 2 is heated by a furnace. The highest desorber temperature is not limited by the heat source (for example, ambient air), but by the chemical stability and corrosiveness of the working mixture, for example difluoromonochloromethane/tetraethylene glycol dimethyl ether.

In order that the installation at outside temperatures of about −2° C. can meet the heating requirement without changing the working medium cycle and without increasing the desorber temperature, a by-pass to the heat exchanger 5 and hence to the evaporator is located between condenser 3 and absorber 4. The by-pass consists of a vapor line and a liquid line and a compressor unit 6. Preferably a jet apparatus is used as compressor unit. The vapor line starts to open at a preselected low outside temperature if the latter temperature drops further. Then the cooling medium vapor flows at high pressure into the compressor 6 and compresses the cooling medium flow through the evaporator 1 from pressure $P_o$ to a higher pressure $P_i$ so that in the absorber 4 even at these temperatures cooling medium is absorbed which has received heat from the environment. This means, by this arrangement, the temperature limit below which the installation functions as boiler heating system, is shifted to lower temperatures. Without this measure, with the boiler heat flow constant, the temperature of the desorber 2 would rise and the thermal load of the mixture would enter regions where its stability and corrosiveness have not yet been studied and hence are not guaranteed. When the lower pressure limit of absorber 4 can no longer be obtained by opening the vapor line, the liquid by-pass is opened and the installation then functions as boiler heating system. This also opens the by-passes of secondary heat exchanger 7, virtually transferring the disorder power directly to the main heat exchanger 8.

The cooling of the lean mixture, in the main heat exchanger 8 which is ahead of the absorber 4 results in a further improvement of the arrangement. This measure simplifies the construction of absorber 4 and the absorption of the cooling agent vapor in the mixture becomes greater. Provision is made to carry off, via the main heat exchanger 8, sufficient heat so that the absorber 4 can be operated adiabatically. The heat output in the interposed main heat exchanger 8, besides the other advantages resulting from the arrangement, is simpler from an apparatus viewpoint and thermodynamically superior to an arrangement in absorber 4.

According to the method of the present invention, the cooling agent cycle can be disconnected if there is insufficient evaporator pressure, dependent on the outside temperature, and the mixed medium cycle can be used as heat carrier. Preferably, the heat exchanger 7 is by-passed during heat carrier operation and the heat is delivered exclusively via the main heat exchanger 8. If the disorder 2 is heated with oil, gas or solid fuels, the flue gases can be cooled in a unit 9 following the disorder 2 by a medium to be heated. The flue gas can be used as driving vapor flow in the compressor unit 6. An alternative is shown in FIG. 2 where the useful heat of the flue gases coming from the disorder is directly applied to water. The designations (a) to (n) in FIG. 2 denote the balance points for the calculations in the following example in which the designations (a) to (n) are replaced by the numbers 1 to 14, respectively, for purposes of simplifying the analysis.

The method in accordance with the present invention is explained in detail below.

Figure 3:
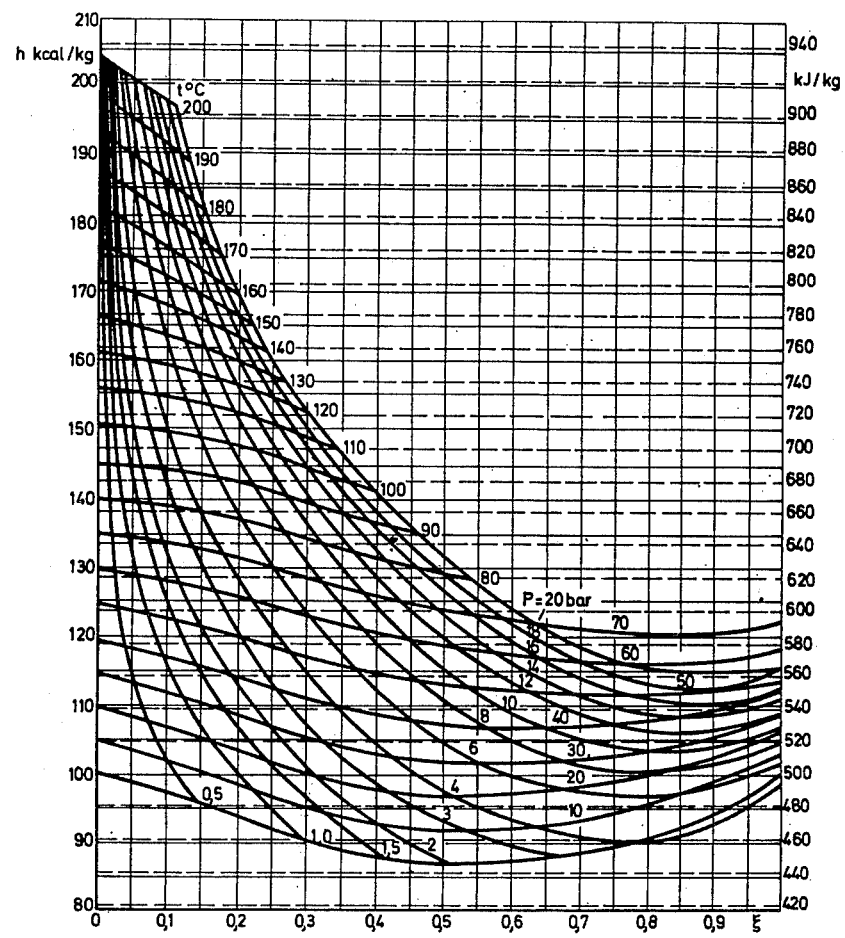
FIG. 3 show a mixing ratio/enthalpy diagram for a working medium.

In the ten cycle apparatuses of the arrangement, the condition of the material flows is changed by pressure change, heat input or output or the supply of pump energy. From the conditions of the inflowing material flows and the given condition changes in the apparatuses, one can calculate the conditions of all material flows by the concentration/enthalpy diagram, shown in FIG. 3 for difluoromonochloromethane/dimethyl ether of tetraethyleneglycol by W. P. Lateschew, Wnichi N. 3243, Moscow 1968. The equations for these calculations are shown in the following Table 1. The sequence of the equations in Table 1 corresponds to the sequence in which the cooling agent or the cooling agent medium mixture flow through the apparatuses.

TABLE I

Condenser (pure cooling agent)
$\dot{Q}_K / \dot{m}_1 = h_1 \ h_2 \cdot \dot{m}_2/\dot{m}_{KM} \ h_3 \cdot \dot{m}_3/\dot{m}_{KM}$ TABLE I-continued $\dot{m}_1 = \dot{m}_2 + \dot{m}_3$
$P_1 \approx P_2 \approx P_3$
$\Delta T_2 = T_2 - T_{return} = 10K$
$(T_{advance} - T_{return} = 10K)$ Heat exchanger I (pure cooling agent)
$h_2 - h_4 = h_6 - h_7$
$\dot{m}_2 = \dot{m}_4 = \dot{m}_6 = \dot{m}_7$
$P_2 \approx P_4; P_6 \approx P_7$
$\Delta T_7 = T_2 - T_7 = 5K$ Throttle (pure cooling agent)
$h_5 = h_4$
$P_5 = P_s(T_o) < P_4$ Evaporator (pure cooling agent)
$\dot{Q}_o/\dot{m}_5 = h_6 - h_5$
$\dot{m}_6 = \dot{m}_5$
$P_6 \approx P_5 = P_s(T_o)$
$\Delta T_6 = T_{environment} - T_o = 8K$ Jet apparatus (pure cooling medium)
$\dot{m}_8 \cdot h_8 = \dot{m}_7 \cdot h_7 + \dot{m}_3 \cdot h_3$
$\dot{m}_8 = \dot{m}_7 + \dot{m}_3 = \dot{m}_1 = \dot{m}_2 + \dot{m}_3$
$P_7 < P_8 < P_3$
$\eta_{str} = (\dot{m}_3/\dot{m}_7)th \ / \ (\dot{m}_3/\dot{m}_7) = 0.08$
$\eta_{str} = \dfrac{h_{8,th} - h_7}{h_3 - h_{8,th}} \cdot \dfrac{h_3 - h_8}{h_8 - h_7}$
$\dot{m}_8 \cdot s_{8,th} = \dot{m}_7 \cdot s_7 + \dot{m}_3 \cdot s_3$
$P_8 = P(h_{8,th}, s_{8,th})$
$T_8 = T(p_8, h_8)$ Absorber (mixture + pure cooling agent)
$\dot{m}_9 \cdot h_9 = \dot{m}_8 \cdot h_8 + \dot{m}_{14} \cdot h_{14}$
$\dot{m}_9 = \dot{m}_8 + \dot{m}_{14}$
$\Delta \xi = \xi_9 - \xi_{14} = \dot{m}_8/\dot{m}_9$
$P_9 < P_8$
$T_9 < T(\xi_9, P_9)$ Pump (mixture)
$L = \dot{m}_{10} \cdot (P_{10} - P_9) / (\rho \cdot \eta)$
$\dot{m}_{10} = \dot{m}_9$
$\eta = 0.7$
$10 = 9$
$h_{10} = h_9 + (P_{10} - P_9)/(\rho \cdot \eta)$
$T_{10} = T(h_{10}, \xi_{10})$ Heat Exchanger II:
$\dot{m}_{11} h_1 - \dot{m}_{10} h_{10} = \dot{m}_{12} h_{12} - \dot{m}_{13} h_{13}$
$\dot{m}_{11} = \dot{m}_{10}$
$\dot{m}_{13} = \dot{m}_{12}$
$P_{11} \approx P_{10} \approx P_{12} \approx P_{13}$
$\Delta T = T_{13} - T_{10} = 10K$ Desorber (mixture + pure cooling agent)
$\dot{Q}_H = \dot{m}_{12}h_{12} + \dot{m}_1 \cdot h_1 - \dot{m}_{11} \cdot h_{11}$
$\dot{m}_{11} = \dot{m}_{12} + \dot{m}_1$
$\Delta \xi = \xi_{11} - \xi_{12} = \dot{m}_1/\dot{m}_{11}$
$P_1 = P_{12} \approx P_{11}$
$T_1 = T_{12} \approx T(\xi_{12}, P_{12})$ Main Heat exchanger (mixture)
$\dot{Q}_a = \dot{m}_{13} \cdot h_{13} - \dot{m}_{14} \cdot h_{14}$
$\Delta T = T_{14} - T_{return} = 5K$ In Table 1 the symbols represent the following:

| Symbol | Meaning | Unit |
|---|---|---|
| h | enthalpy | kJ/kg |
| L | pump power | kW |
| $\dot{m}$ | mass flow | kg/h |
| p | pressure | bar |
| Q | heat flow | kW |
| r | heat of evaporation | kJ/kg |
| T | temperature | K |
| t | temperature | °C. |
| Δ | difference | — |
| η | efficiency | — |
| ξ | mixing ratio | — |
| ζ | density | kg/m³ |

Under the following conditions:

Heating water

-continued

| | |  |
|---|---|---|
| initial temperature | 55° C. | |
| temperature spread | 15 K | |
| Heating power | 12 kW | |
| Heat source | | |
| (a) air | | |
| air temperature | −2° C. | |
| (b) ground water | | corresponds thermo- |
| water temperature | 10° C. | dynamically to an air |
| | | temperature of 10° C. | and the working medium pair difluoromonochloromethane/tetraethylene glycol dimethyl ether, the process parameters are variable only within narrow limits.

Analysis for the design parameter $t_o = 10°$ C. where $t_o$ is the evaporation temperature. With the values assumed in Table 1, the condensation temperature of the cooling agent difluoromonochloromethane is 60° C. and the condensation pressure is 24.2 bar. The evaporation temperature of the cooling agent difluoromonochloromethane is also established by the above values and Table 1. The cooling agent evaporates at $-10°$ C. and 3.5 bar.

Between desorber and condenser, the pressure drop is estimated to be about 0.8 bar and hence 25 bar was selected as desorber pressure. The 25-bar isobar in the h-ε-graph of the mixture difluoromonochloromethane/dimethyl ether of tetraethylene glycol (FIG. 3) and the 176° C. isotherm (the highest isotherm investigated to date experimentally for stability and corrosive-ness) intersect at the weight concentration 0.2 weight ratio. Hence the state of the lean mixture at the desorber output is established at 25 bar, 176° C. and a concentration of 0.2 weight fraction of difluoro monochloromethane.

In the absorber, the cooling agent difluoromonochloromethane is absorbed in the lean mixture without heat transfer, hence the temperature and the difluoro monochloromethane concentration in the mixture rise. The mixture leaves the absorber as a mixture rich in cooling agent. Its point of state is located on the mixture straight-line cooling agent vapor/lean mixture underneath the equilibrium line for the absorber pressure, since for reasons of material transition the equilibrium line cannot be reached and must not be reached because of the operational behavior of the mixture pump.

The mixture enters the absorber with 20 percent by weight of cooling agent difluoromonochloromethane at 45° C. (Table 1). The concentration difference rich/lean mixture is selected at $\Delta\xi = 0.05$. Hence the temperature of the rich mixture is $t_9 = 50°$ C. and the absorber pressure $P_{abs}$ must be greater than 3.8 bar to maintain the process.

With the obtained process parameters
$t_1 = 176°$ C.
$\xi_1 = 0.2$ weight fraction
$t_{14} = 45°$ C.
$t_9 = 50°$ C.
$\Delta\xi = \xi_9\xi_1 = 0.05$ weight fraction
the arrangement is calculated thermodynamically.

The following Tables 2 and 3 sum up the process data for the selected material pair difluoromonochloromethane/tetraethyleneglycol dimethyl ether, on which the apparatus dimensions are based.

With the energy flows of Table 3 and using estimated values for energy losses (boiler, flue gas, pump) and the evaporator fan drive, the energy balance is established for the temperature range under consideration.

The following Table 4 shows the energy balance for the absorption heat pump arrangement of FIGS. 1 and 2.

When the evaporator pressure is inadequate or differs from the predetermined value, dependent on outside temperature, the cooling agent cycle may be shut off, and a mixture cycle may be used as heat carrier. The mixture cycle corresponds to the mixture passed through the main heat exchanger 8, absorber 4 and burner with the expeller 2. The mixture medium does not absorb in this case any cooling agent, but serves instead only as heat carrier for the energy which it received in the expeller 2 and transfers in the main heat exchanger 8. The arrangement is operated in this case as a heat carrier arrangement, and this operation is denoted as heat carrier operation.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalents of the following claims.

TABLE 2 t in °C.; p in bar

| evaporator | | heat exchanger I | | | | condenser | | | | | | absorber | | | |
|---|---|---|---|---|---|---|---|---|---|---|---|---|---|---|---|
| cooling agent | | warm side | | cold side | | cooling agent | | | | | | lean mixture | | rich mixture | |
| in | out | in | out | in | out | in | TD[1] out | SD[1] out | R 22[2] | | | | | | |
| t p | t p | t p | t p | t p | t p | t p | t p | t p | t p | t p | t p | t p | t p | t p | t p |
| −7.5 3.9 | −10 3.55 | 50 24 | 20 23.8 | −10 3.55 | 45 3.45 | 176 25 | 60 24 | 50 24 | 40 4.0 | | | 45 4.0 | | 50 3.8 | |
| 11.0 7.0 | +10 6.8 | 50 24 | 31 23.8 | 10 6.8 | 45 6.7 | 176 25 | — — | 50 24 | 45 6.2 | | | 45 6.2 | | 59 6.0 | |

| | | heat exchanger II | | | | | | | flue gas after cooling | | main heat exchanger | |
|---|---|---|---|---|---|---|---|---|---|---|---|---|
| mixture pump | | rich mixture | | lean mixture | | desorber | | | flue gas | | lean mixture | |
| in | out | in | out | in | out | rich | lean | R 22 | in | out | in | out |
| t p | t p | t p | t p | t p | t p | t p | t p | t p | t p | t p | t p | t p |
| 50 3.8 | 51 26 | 51 26 | 152 25 | 176 25 | 65 24 | 152 25 | 176 25 | 176 25 | 200 | 100 | 65 24 | 45 23 |
| 59 6.0 | 60 26 | 60 26 | 157 25 | 176 25 | 65 24 | 157 25 | 176 25 | 176 25 | 200 | 100 | 65 24 | 45 23 |

Temperatures and Pressures at the Evaporation Temperatures −10 and +10° C.
(Pressure Losses for the Apparatuses Estimated)
[1] TD = driving vapor SD = Suction vapor
[2] R 22 = difluoromonochloromethane

TABLE 3

Mass and Energy Flows over the Evaporation

| operating condition evaporator t °C. | p bar | R 22[3] | mass flows m kg/h jet apparatus suction vapor | driving vapor | lean mixture | rich mixture | de-gassing width Δξ % | mixture pump[1] | energy flows Q kW overheating | condenser condensation | undercooling | desorber theoretical | burner at η H= 0.88 | flue gas after cooler[2] | heat exchange I | II | main heat exchanger | e-vaporator |
|---|---|---|---|---|---|---|---|---|---|---|---|---|---|---|---|---|---|---|
| −10 | 3.55 | 40 | 22 | 18 | 753 | 793 | 0.05 | 0.46 | 1.22 | 0.86 | 0.08 | 10.26 | 11.65 | 0.61 | 0.23 | 41.9 | 9.84 | 1.08 |
| ±0 | 4.98 | 49 | 49 | 0 | 646 | 695 | 0.07 | 0.41 | 1.49 | 1.90 | 0.18 | 9.06 | 10.30 | 0.47 | 0.43 | 35.9 | 8.43 | 2.36 |
| +10 | 6.80 | 70 | 70 | 0 | 520 | 590 | 0.12 | 0.35 | 2.18 | 2.77 | 0.26 | 8.12 | 9.23 | 0.42 | 0.50 | 28.9 | 6.79 | 3.38 |

Temperature Range −10° C. to +10° C.
[1] free of loss
[2] oil fired
[3] difluoromonochloromethane

TABLE 4

| $t_o$ °C. | In kW burner | pump[1] | fan | Out kW main heat-exchanger | condenser | flue gas cooler | heat ratio |
|---|---|---|---|---|---|---|---|
| −10 | 11.65 | 0.66 | | 9.84 | 2.16 | 0.61 | 1.01 |
| ±0 | 10.30 | 0.58 | 0.15 | 8.43 | 3.57 | 0.47 | 1.13 |
| +10 | 9.23 | 0.50 | flat rate | 6.79 | 5.21 | 0.42 | 1.26 |

[1] η = 0.7

What is claimed is:

1. A method of heating with an absorption heat pump comprising an evaporator in which a cooling agent is evaporated by heat from outside air; an absorber in which the cooling agent vapor is absorbed adiabatically in a liquid lean mixture of cooling agent and another higher boiling liquid to form a rich mixture; a desorber in which the rich mixture is heated to evaporate the cooling agent and form a lean mixture; a condenser in which cooling agent vapor from the desorber is condensed and returned to the evaporator; a main heat-exchanger in which heat is given off from the lean mixture leaving the desorber; a secondary heat exchanger in which heat from the lean mixture leaving the desorber is transferred to the rich mixture leaving the absorber; a compressor located between the condenser and the absorber and a by-pass system by which the secondary heat exchanger can be by-passed; said method comprising the steps of maintaining the pressure of the absorber independently from the pressure of the evaporator by means of the compressor;

cooling the lean mixture returning to the absorber in the main heat exchanger to a lower temperature than in the secondary heat exchanger;

shutting off the flow of cooling agent from the desorber to the absorber when the pressure in the evaporator differs from a pre-determined value dependent on the outside temperature; and by-passing the secondary heat exchanger thereby giving off heat exclusively via the main heat exchanger.

2. A method as defined in claim 1 wherein said compressor comprises jet apparatus.

3. A method as defined in claim 1 including the steps of: cooling flue gases in a unit communicating with the expeller with a medium to be heated when the expeller operates on oil, gas or solid fuels.

4. A method as defined in claim 1 including the steps of: using flue gas for evaporating liquid cooling agent; and using vaporous cooling agent as propellant vapor in the compressor.

* * * * *